United States Patent
Zhang et al.

(10) Patent No.: US 11,941,171 B1
(45) Date of Patent: Mar. 26, 2024

(54) EYE GAZE TRACKING METHOD, APPARATUS AND SYSTEM

(71) Applicant: BOE Technology Group Co., Ltd., Beijing (CN)

(72) Inventors: Menglei Zhang, Beijing (CN); Jiankang Sun, Beijing (CN); Guixin Yan, Beijing (CN); Yaoyu Lv, Beijing (CN); Yachong Xue, Beijing (CN); Xinkai Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/765,612

(22) PCT Filed: May 28, 2021

(86) PCT No.: PCT/CN2021/096793
§ 371 (c)(1),
(2) Date: Mar. 31, 2022

(87) PCT Pub. No.: WO2022/246804
PCT Pub. Date: Dec. 1, 2022

(51) Int. Cl.
| | |
|---|---|
| G06F 3/01 | (2006.01) |
| G06T 7/215 | (2017.01) |
| G06T 7/292 | (2017.01) |
| G06T 7/73 | (2017.01) |
| G06T 11/00 | (2006.01) |
| G06V 10/22 | (2022.01) |
| G06V 10/764 | (2022.01) |
| G06V 10/82 | (2022.01) |
| G06V 40/10 | (2022.01) |

(52) U.S. Cl.
CPC .............. *G06F 3/013* (2013.01); *G06T 7/215* (2017.01); *G06T 7/292* (2017.01); *G06T 7/74* (2017.01); *G06T 11/00* (2013.01); *G06V 10/235* (2022.01); *G06V 10/764* (2022.01); *G06V 10/82* (2022.01); *G06V 40/10* (2022.01); *G06T 2207/20084* (2013.01); *G06T 2207/30201* (2013.01)

(58) Field of Classification Search
CPC ......... G06F 3/013; G06T 7/215; G06T 7/292; G06T 7/74; G06T 11/00; G06T 2207/20084; G06T 2207/30201; G06V 10/235; G06V 10/764; G06V 10/82; G06V 40/10
See application file for complete search history.

(56) References Cited

U.S. PATENT DOCUMENTS

2020/0202562 A1* 6/2020 Guo ...................... G06T 7/246

* cited by examiner

*Primary Examiner* — Abhishek Sarma
(74) *Attorney, Agent, or Firm* — IPro, PLLC

(57) ABSTRACT

An eye gaze tracking method, apparatus and system are provided, which belong to the technical field of image processing. The eye gaze tracking method includes: capturing, by at least two cameras, frames of facial images when a viewer views display screen; segmenting a current frame of facial image with pre-trained eye detection model to obtain an image for left and right eyes; calculating a similarity between the current frame of facial image and each of previous N frames of facial images; if the similarity between the current frame of facial image and each of previous N frames of facial images is less than the preset threshold, detecting a position on display screen at which the eyes of the viewer gaze with pre-trained eye detection model. Embodiments of the present disclosure can improve accuracy and efficiency of eye gaze tracking.

20 Claims, 3 Drawing Sheets

EYE GAZE TRACKING METHOD, APPARATUS AND SYSTEM

CROSS-REFERENCE TO RELATED APPLICATIONS

This application is the U.S. national phase of PCT Application No. PCT/CN2021/096793 filed on May 28, 2021, the disclosure of which is incorporated by reference in its entirety.

TECHNICAL FIELD

The present disclosure relates to the technical field of image processing, and in particular to an eye gaze tracking method, apparatus and system.

BACKGROUND

Human-machine interaction is a technology to study the interaction between human and machine. Through human-machine interaction technology, all possible information channels can be used to realize the communication between human and machine. With the rapid development of electronic technology, human-machine interaction technology is widely used in the interaction between human and display devices, and the method of human-machine interaction based on eye gaze tracking has been widely concerned. Eye gaze tracking is a technology to obtain a current "gaze direction" of the user by using means such as mechanical, electronic, optical detections.

Existing eye gaze tracking techniques have a low accuracy in determining a position on the screen at which the eyes gaze, and have a low response speed.

SUMMARY

The present disclosure is to provide an eye gaze tracking method, apparatus and system capable of improving the accuracy and efficiency of the eye gaze tracking.

To achieve this, embodiments of the present disclosure provide technical solution as follows.

In one aspect, an eye gaze tracking method is provided, including:
  capturing, by at least two cameras, a plurality of frames of facial images when a viewer views a display screen;
  segmenting a current frame of facial image with a pre-trained eye detection model to obtain an image for left and right eyes, wherein the eye detection model is based on a convolutional neural network, an input of the eye detection model is the facial image, and an output of the eye detection model is the image for left and right eyes that is segmented from the facial image; and
  calculating a similarity between the current frame of facial image and each frame of facial image in previous N frames of facial images; if a similarity between the current frame of facial image and a facial image n in the previous N frames of facial image is greater than a preset threshold, determining a prediction result of a position at which the eyes gaze for the facial image n to be a prediction result of a position at which the eyes gaze for the current frame of facial image; if the similarity between the current frame of facial image and each frame of facial image in previous N frames of facial images is not greater than the preset threshold, detecting a position on display screen at which the eyes of the viewer gaze with a pre-trained eye gaze recognition model, wherein the eye gaze recognition model is based on a convolutional neural network, an input of the eye gaze recognition model is the image for left and right eyes that is segmented from the facial image and prediction results of positions at which the eyes gaze for the previous N frames of facial image, and an output of the eye gaze recognition model is the prediction result of the position at which the eyes gaze for the current frame of facial image, wherein N is a positive integer, and n is an integer greater than 1 and not greater than N.

In some embodiments, the method further includes steps of obtaining the eye detection model by training, where the obtaining the eye detection model by training includes:
  establishing a first training data set, wherein the first training data set comprises a plurality of groups of first training data, each group of the plurality of groups of first training data comprises a facial image and an eye contour labeled in the facial image, and facial images and eye contours from different groups of first training data are different;
  establishing an initial eye detection model, wherein the initial eye detection model comprises a down-sampling network and an up-sampling network, an input of the down-sampling network is the facial image, and an output of the up-sampling network is an eye contour in the facial image; and
  training the initial eye detection model with the plurality of groups of first training data, and saving a model obtained after the training is performed for K times as the eye detection model, wherein K is a positive integer.

In some embodiments, the down-sampling network comprises M down-sampling layers, the up-sampling network comprises M layers of up-sampling layers, M is an integer greater than 1, and the M down-sampling layers are in one-to-one correspondence with the M up-sampling layers;
  an input of the first down-sampling layer is a facial image, and the i-th down-sampling layer performs a convolution operation on inputted feature with different convolution kernels, combines calculation results together and transfers the combined calculation results to the (i+1)-th down-sampling layer; an input of the i-th up-sampling layer is a combination of an output of the (i+1)-th up-sampling layer and a first result, wherein the first result is a result obtained after a convolutional calculation is performed on an output of the i-th down-sampling layer, i is greater than or equal to 1 and less than or equal to M-1; and
  the M-th down-sampling layer performs a convolution operation on inputted feature, and transfers a result to the M-th up-sampling layer, and an output of the M-th up-sampling layer is the eye contour in the facial image.

In some embodiments, the up-sampling layer is based on an interpolation.

In some embodiments, the method further includes steps of obtaining the eye gaze recognition model by training, where the obtaining the eye detection model by training including:
  establishing a second training data set, wherein the second training data set comprises a plurality of groups of second training data, and each group of the plurality of groups of second training data comprises a facial image, an image for left and right eyes that is segmented from the facial image, positions at which the eyes gaze for previous A frames of facial images, and a position at which the eyes gaze for a current frame of facial image, and facial images from different groups of second training data are different;

establishing an initial eye gaze recognition model, wherein an input of the initial eye gaze recognition model is the image for left and right eyes that is segmented from a facial image and the positions at which the eyes gaze for the previous A frames of facial images, and an output of the initial eye gaze recognition model is a position at which the eyes gaze for the current frame of facial image; and training the initial eye gaze recognition model with the plurality of groups of second training data, and saving a model obtained after the training is performed for L times as the eye gaze recognition model, wherein L and A are positive integers.

In some embodiments, prior to training the initial eye gaze recognition model with the plurality of groups of second training data, the method further comprises preprocessing the second training data, comprising:

determining a distance between the viewer and the display screen according to the facial image; and adjusting a size of the facial image and a size of the image for left and right eyes according to the distance.

In some embodiments, obtaining the second training data comprises: displaying a plurality of test points on the display screen; and capturing, by the at least two cameras, a facial image of the viewer gazing at the test point in front of the display screen, a position of the test point is a position at which the eyes gaze.

In some embodiments, the eye gaze recognition model comprises a first layer of Dense module, a first layer of transition layer, a second layer of Dense module, a second layer of transition layer, a third layer of Dense module, a third layer of transition layer and a full connection layer arranged in the sequence listed, and the Dense module comprises a plurality of 1*1 convolutional layers and 3*3 convolutional layers connected in sequence, and a residual for output from the (2j−1)-th convolutional layer and the 2j-th convolutional layer is calculated and inputted to the (2j+5)-th convolutional layer, wherein j is a positive integer.

Embodiments of the present disclosure also provides an eye gaze tracking apparatus, including:

an image capturing module, configured to capture, by at least two cameras, a plurality of frames of facial images when a viewer views a display screen;

an eye detecting module, configured to segment a current frame of facial image with a pre-trained eye detection model to obtain an image for left and right eyes, wherein the eye detection model is based on a convolutional neural network, an input of the eye detection model is the facial image, and an output is the image for left and right eyes that is segmented from the facial image; and an eye gaze recognition module, configured to calculate a similarity between the current frame of facial image and each frame of facial image in previous N frames of facial images; if a similarity between the current frame of facial image and a facial image n in the previous N frames of facial image is greater than a preset threshold, to determine a prediction result of a position at which the eyes gaze for the facial image n to be a prediction result of a position at which the eyes gaze for the current frame of facial image; if the similarity between the current frame of facial image and each frame of facial image in previous N frames of facial images is not greater than the preset threshold, to detect a position on display screen at which the eyes of the viewer gaze with a pre-trained eye gaze recognition model, wherein the eye gaze recognition model is based on a convolutional neural network, an input of the eye gaze recognition model is the image for left and right eyes that is segmented from the facial image and prediction results of positions at which the eyes gaze for the previous N frames of facial images, and an output of the eye gaze recognition model is the prediction result of the position at which the eyes gaze for the current frame of facial image, wherein N is a positive integer, and n is an integer greater than 1 and not greater than N.

In some embodiments, an eye detection model training module is also included, which is configured for obtaining the eye detection model by training, where the eye detection model training module includes:

a first sub-module, configured to establish a first training data set, wherein the first training data set comprises a plurality of groups of first training data, each group of the plurality of groups of first training data includes a facial image and an eye contour labeled in the facial image, and facial images and eye contours from different groups of first training data are different;

a second sub-module, configured to establish an initial eye detection model, wherein the initial eye detection model comprises a down-sampling network and an up-sampling network, an input of the down-sampling network is the facial image, and an output of the up-sampling network is an eye contour in the facial image; and a third sub-module, configured to train the initial eye detection model with the plurality of groups of first training data, and saving a model obtained after the training is performed for K times as the eye detection model, wherein K is positive integer.

In some embodiments, an eye gaze recognition model training module is also included, which is configured for obtaining the eye detection model by training, where the eye gaze recognition model training module includes:

a fourth sub-module, configured to establish the second training data set, wherein the second training data set comprises a plurality of groups of second training data, and each group of the plurality of groups of second training data comprises a facial image, an image for left and right eyes that is segmented from the facial image, positions at which the eyes gaze for previous A frames of facial images, and a position at which the eyes gaze for a current frame of facial image, and facial images from different groups of second training data are different;

a fifth sub-module, configured to establish an initial eye gaze recognition model, wherein an input of the initial eye gaze recognition model is the image for left and right eyes that is segmented from the facial image and the positions at which the eyes gaze for the previous A frames of facial images, and an output of the initial eye gaze recognition model is a position at which the eyes gaze for the current frame of facial image; and a sixth sub-module, configured to train the initial eye gaze recognition model with the plurality of groups of second training data, and saving a model obtained after the training is performed for L times as the eye gaze recognition model, wherein L and A are positive integers.

Embodiments of the present disclosure also provides an eye gaze tracking system including a display screen, at least two cameras and the eye gaze tracking apparatus as described above.

Embodiments of the present disclosure also provides an eye gaze tracking apparatus, the eye gaze tracking apparatus including:

a memory and an executor, the executor is configured for performing the method as described above.

Embodiments of the present disclosure also provide a computer readable storage medium having a computer program stored thereon, wherein the program, when being executed by a processor, implements steps of the method as described above.

Embodiments of the present disclosure have the following advantageous effects.

In the above-mentioned solution, frames of facial images of a viewer when watching a display screen are captured with using at least two cameras, and a position which the viewer's eyes gaze at on the display screen is determined with the pre-trained eye detection model and the pre-trained eye gaze recognition model, the speed of eye gaze tracking is fast. In addition, factors such as motion features of a face and environmental impact can be inputted to the model by deep learning, which can improve the accuracy of eye gaze tracking.

DETAILED DESCRIPTION

In order to make the technical issue, technical solution and advantages according to embodiments of the present disclosure clear, a detailed description will be given hereinafter with reference to the drawings and specific embodiments.

Embodiments of the present disclosure provides an eye gaze tracking method, apparatus and system, which are capable of improving an accuracy and efficiency of the eye gaze tracking.

Figure 1:
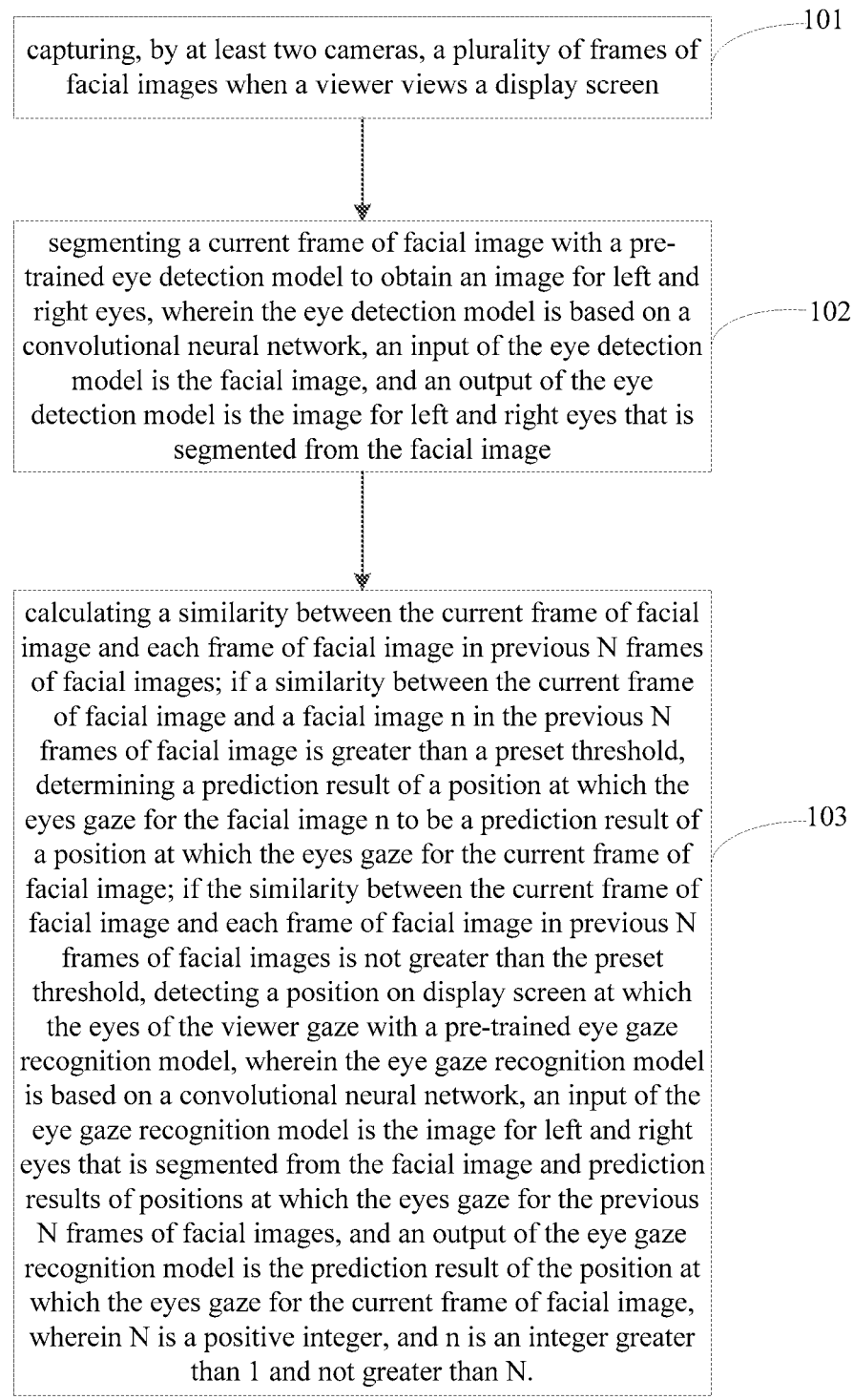
FIG. 1 is a schematic flow diagram of an eye gaze tracking method according to embodiments of the present disclosure.

Embodiments of the present disclosure provides an eye gaze tracking method, as shown in FIG. 1, including steps 101 to 103.

Step 101: capturing, by at least two cameras, a plurality of frames of facial images when a viewer views a display screen.

Step 102: segmenting a current frame of facial image with a pre-trained eye detection model to obtain an image for left and right eyes, wherein the eye detection model is based on a convolutional neural network, an input of the eye detection model is the facial image, and an output of the eye detection model is the image for left and right eyes that is segmented from the facial image.

Step 103: calculating a similarity between the current frame of facial image and each frame of facial image in previous N frames of facial images; if a similarity between the current frame of facial image and a facial image n in the previous N frames of facial image is greater than a preset threshold, determining a prediction result of a position at which the eyes gaze for the facial image n to be a prediction result of a position at which the eyes gaze for the current frame of facial image; if the similarity between the current frame of facial image and each frame of facial image in previous N frames of facial images is not greater than the preset threshold, detecting a position on display screen at which the eyes of the viewer gaze, wherein the eye gaze recognition model is based on a convolutional neural network, an input of the eye gaze recognition model is the image for left and right eyes that is segmented from the facial image and prediction results of positions at which the eyes gaze for the previous N frames of facial image, and an output of the eye gaze recognition model is the prediction result of the position at which the eyes gaze for the current frame of facial image, wherein N is a positive integer, and n is an integer greater than 1 and not greater than N.

Where, two cameras in the at least two cameras may be two cameras of the same binocular camera.

In this embodiment, the plurality of frames of facial images when the viewer is watching the display screen is collected by the at least two cameras, and the position on the screen at which the viewer's eyes gaze is determined with the pre-trained eye detection model and the pre-trained eye gaze recognition model, the speed of eye gaze tracking is fast. In addition, factors such as motion features and environmental impact of a face can be inputted into a model by the deep learning, which can improve the accuracy of eye gaze tracking.

In addition, in this embodiment, before inputting data into the eye gaze recognition model, a determination step is added, to determine whether the current frame of facial image is highly similar to the previous N frames of facial images (the similarity is greater than the preset threshold, and the preset threshold can be fitted according to other data. for example, 98%), if the current frame of facial image is highly similar to the previous N frames of facial image, it can be considered that the eye gaze of the viewer is substantially unchanged, and the prediction result of the position at which the eyes gaze for the facial image n can be outputted directly as the prediction result of position at which the eyes gaze for the current frame of facial image, which can reduce the amount of computation and thus improve the speed of eye gaze tracking. If the current frame of facial image is not highly similar to the previous N frames of facial image, then the data can be inputted into the eye gaze recognition model for recognizing eye gaze.

The technical solution of this embodiment can be applied in a variety of scenarios, such as the field of human-machine interaction, assisted driving, psychological research, Virtual Reality and military.

In a specific embodiment, the technical solution of this embodiment may be applied in a scenario of a smart screen, the position at which the viewer's eyes gaze may be determined through the eye gaze tracking, and then a driving means of the smart screen may be drove to realize a self-adaptive adjustment for horizontal and vertical placement modes of the smart screen.

In this embodiment, a camera is needed to capture a facial image of the viewer. The camera may be an infrared camera, so that the camera can capture the facial image of the viewer even in case of no visible light, which is independent of the environment. In order to improve the accuracy of eye gaze tracking, multiple cameras may be provided to capture facial images of the viewer, and parameters such as the field of view and resolution for the cameras can be set according to specific requirements.

In this embodiment, when the viewer looks at the display screen, cameras acquires the facial image of the viewer, stores the facial image of the viewer, and transmit the facial image of the viewer to a processor, the processor stores a pre-trained eye detection model and eye gaze recognition model, and can perform the eye gaze tracking with the eye detection model and the eye gaze recognition model to determine the position on the display screen at which the viewer's eyes gaze, the position may be represented by coordinates, and the coordinate system of the coordinates may take a point of the display screen as the origin.

The camera may transmit a facial image captured in real time to the processor, and may also capture multiple frames of facial images such as N frames of facial images and save the same, and then transmit the N frames of facial images to the processor for image processing to output the position at which the eyes gaze.

In an alternative embodiment of the present disclosure, the method further includes the steps of obtaining the eye detection model by training, where obtaining the eye detection model by training including the following steps.

Step 1, establishing a first training data set, wherein the first training data set comprises a plurality of groups of first training data, each group of the plurality of groups of first training data comprises a facial image and an eye contour labeled in the facial image, and facial images and eye contours from different groups of first training data are different.

Specifically, facial images for viewers of different ages and genders may be collected, and an eye contour in a facial image can be labeled, where contours for left and right eyes are labeled, respectively, to obtain the plurality of groups of first training data.

Step 2, establishing an initial eye detection model, wherein the initial eye detection model comprises a down-sampling network and an up-sampling network, an input of the down-sampling network is the facial image, and an output of the up-sampling network is an eye contour in the facial image.

In the embodiment, the initial eye detection model is based on an improved U-Net structure; the down-sampling network includes M down-sampling layers; the up-sampling network includes M up-sampling layers; M is an integer greater than 1; and the down-sampling layers are in one-to-one correspondence with the up-sampling layers; an input of the first down-sampling layer is a facial image, and the i-th down-sampling layer performs a convolution operation on inputted feature with different convolution kernels, and then combines the calculation results together and transfers the combined calculation results to the (i+1)-th down-sampling layer; an input of the i-th up-sampling layer is a combination of an output of the (i+1)-th up-sampling layer and a first result, wherein the first result is a result obtained after a convolutional calculation is performed on an output of the i-th down-sampling layer, i is greater than or equal to 1 and less than or equal to M−1; and the M-th down-sampling layer performs a convolution operation on inputted feature, and transfers a result to the M-th up-sampling layer, and an output of the M-th up-sampling layer is the eye contour in the facial image.

Figure 2:
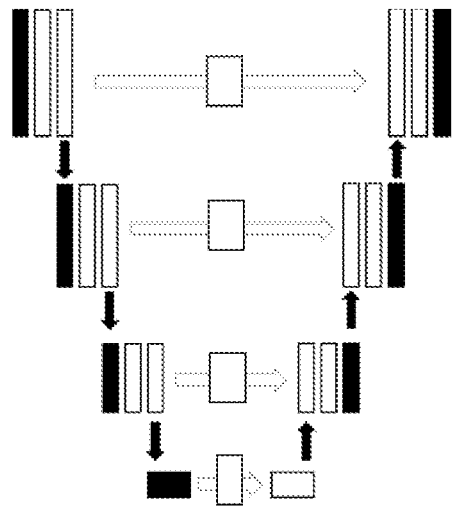
FIG. 2 is a schematic structural diagram of an eye detection model according to embodiments of the present disclosure.

In a specific example, the value of M may be 4. The structure of the initial eye detection model is shown in FIG. 2, where the left half is a down-sampling network and the right half is an up-sampling network, black boxes represent different convolution operations, namely, performing different convolution calculations on the inputted features. The down-sampling layer merging the channels of the calculation results together, but all the convolution calculations do not change the size of the feature mapping; white boxes represent the combination of different convolution operations, but the stride (step size) is different from the black boxes, such that both feature calculation and down-sampling can be performed. A relu (Rectified Linear Unit) layer is arranged following the above layers, after calculations of three down-sampling layers, the obtained feature map is transferred to the next block (model block). When transferring to the down-sampling layer in the lowest layer, an additional convolution calculation is performed, and then the up-sampling calculation begins. The up-sampling process uses a interpolation method, which directly calculates to a corresponding size (namely, to the same size as the down-sampling process); before each up-sampling calculation, the feature map of the down-sampling part on which a convolution calculation of 1*1 is performed is then combined with inputted feature map, namely, combining the shallow features with the deep features, so as to represent the features more clearly.

In this embodiment, there is no pooling layer in the down-sampling network, the structure of the down-sampling network is simplified and the computational efficiency is improved. In the up-sampling process, the transposed convolution is eliminated and the interpolation method is used directly for calculation, which can further improve the computational efficiency. In addition, in the process of combining the down-sampling and up-sampling, a feature extraction (convolution) calculation is added, to combine the shallow features with the deep features, so as to represent the features more clearly.

Step 3, training the initial eye detection model with the plurality of groups of first training data, and saving a model obtained after the training is performed for K times as the eye detection model, wherein K is a positive integer.

The value of K may be set as needed, for example, 50, 100, etc.

In an alternative embodiment of the present disclosure, the method further includes the step of obtaining the eye detection model by training, where the eye gaze recognition model is based on an end-to-end algorithm on the basis of deep learning, by inputting a facial image, an image for left and right eyes segmented from the facial image, prediction results of position at which the eyes gaze for previous N frames of facial images and corresponding weight values, prediction result of the position at which the eyes gaze for the present frame of facial image may be outputted. When training the eye gaze recognition model, some ground-truths (true value) need to be inputted as input value, and after the training is performed for several times, the trained model and its output result are used to perform fine tuning on the model, and the training process is as follows.

Step 1, establishing a second training data set, wherein the second training data set comprises a plurality of groups of second training data, and each group of the plurality of groups of second training data comprises a facial image, an image for left and right eyes that is segmented from the facial image, positions at which the eyes gaze for previous A frames of facial images, and a position at which the eyes gaze for a current frame of facial image. For different groups of second training data, facial images are different, images for left and right eyes that are segmented from the facial images are different, positions at which the eyes gaze for previous A frames of facial images are different, and positions at which the eyes gaze for the current frame of facial image are different.

In particular, a plurality of test points may be displayed on the display screen; a facial image of the viewer gazing at the test point in front of the display screen is captured by the at least two cameras, a position of the test point is a position at which the eyes gaze.

When obtaining the second training data, image acquisition can be performed by a camera, and points of different sizes, colors and background colors (including cases such as appearance, disappearance and random movement of a fixed point) are randomly displayed on the display screen. The viewer in test sits in front of the display screen, and a posture of the viewer is not limited as long as the viewer's face is within the shooting range of the camera. The viewer's eye gaze moves with the points displayed on the display screen, the camera captures the face of the viewer, a data set is established, and the data group is segmented into sequential image streams. Each group of second training data includes a facial image, an image for left and right eyes that is segmented from the facial image, positions at which the eyes gaze for previous A frames of facial images and a position at which the eyes gaze for the present frame of facial image. The camera may include a left eye camera and a right eye camera, and a facial image obtained by left eye camera can be used for eye segmentation to obtain the image for left and right eyes.

In an alternative embodiment of the present disclosure, prior to training the eye gaze recognition initial model with the plurality of groups of second training data, the method further includes pre-processing the second training data, including:
    determining a distance between the viewer and the display screen according to the facial image; and
    adjusting a size of the facial image and a size of the image for left and right eyes according to the distance.

By pre-processing the second training data, a distance dimension can be added as an input to model, thereby improving the accuracy of eye gaze tracking.

Where the relative position between the camera and the display screen is fixed, a distance between the viewer and the camera can be calculated after the facial image is captured, and then the distance between the viewer and the display screen is determined according to the relative position between the camera and the display screen. The relative distance between the viewer and the display screen is attached to the facial image as a new channel dimension, and the attached facial image and a resulting image of eye segmentation are stretched to the same size.

Figure 3:
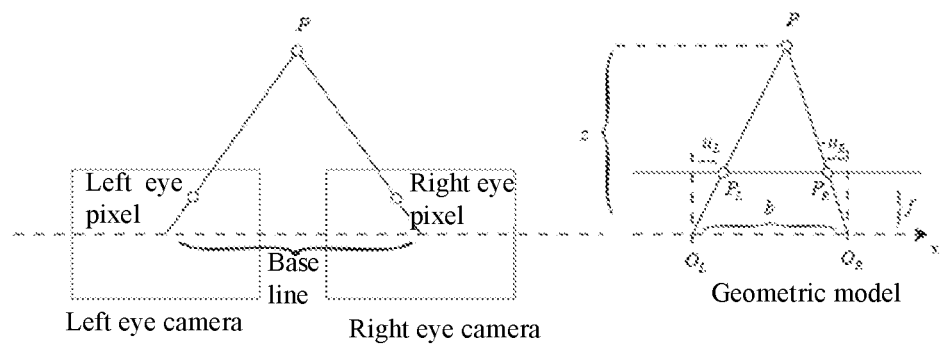
FIG. 3 is a schematic diagram of calculating a distance between a viewer and a display screen according to embodiments of the present disclosure.

As shown in FIG. 3, the left half of FIG. 3 shows corresponding positions of a target point P for the viewer on the left and right views obtained by a left eye camera and a right eye camera, respectively, and the right half of FIG. 3 is a corresponding geometric model. A distance z between the viewer and the display screen may be calculated with the following formula:

$$d = u_L - u_R$$

$$z = f \cdot b / d.$$

where $P_L$ and $P_R$ are the corresponding points of the P point on the left and right views, respectively, $u_L$ and $u_R$ are coordinates of the P point on the left and right views, respectively, f is a binocular focal length for the cameras, b is a binocular baseline for the cameras, $O_L$ is the optical center of the left eye camera, and $O_R$ is the optical center of the right eye camera.

Step 2, establishing an initial eye gaze recognition model, wherein an input of the initial eye gaze recognition model is the image for left and right eyes that is segmented from a facial image and the positions at which the eyes gaze for the previous A frames of facial images, and an output of the initial eye gaze recognition model is a position at which the eyes gaze for the current frame of facial image.

Figure 4:
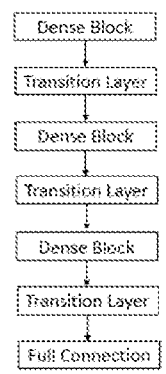
FIG. 4 is a schematic structural diagram of an eye gaze recognition model according to embodiments of the present disclosure.

The initial eye gaze recognition model built by the embodiment is based on DenseNet. As shown in FIG. 4, the eye gaze recognition model successively includes a first layer of Dense module (Dense Block), a first layer of transition layer (Transition Layer), a second layer of Dense module, a second layer of transition layer, a third layer of Dense module, a third layer of transition layer and a full connection layer (Full Connection).

Figure 5:
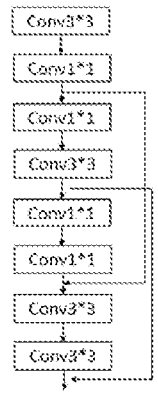
FIG. 5 is a schematic structural diagram of a Dense module according to embodiments of the present disclosure.

As shown in FIG. 5, the Dense module includes a plurality of 1*1 convolutional layers and a plurality of 3*3 convolutional layers connected in sequence. Before the result outputted by every two convolutional layers is inputted to the next two convolutions, a residual is calculated and then inputted to a subsequent convolution, for example, a residual for output from the (2j−1)-th convolutional layer and the 2j-th convolutional layer is calculated and then inputted to the (2j+5)-th convolutional layer, where j is a positive integer.

Step 3, training the initial eye gaze recognition model with the plurality of groups of second training data, and saving a model obtained after the training is performed for L times as the eye gaze recognition model, wherein L and A are positive integers.

In this embodiment, an end-to-end model training is performed, and the value of L can be set as needed, for example, 50, 100, etc.

In order to reduce the amount of computation, before inputting the segmented image for left and right eyes into a pre-trained eye gaze recognition model, the method further includes:
    calculating a similarity between a current frame of facial image and each frame of facial image in the previous N frames of facial images; and
    if the similarity between the current frame of facial image and a facial image n in the previous N frames of facial images is greater than the preset threshold, stopping inputting data into the full connection layer, and determining the prediction result of the position at which the eyes gaze for the facial image n as the prediction result of the position at which the eyes gaze for the current frame of facial image.

Namely, before the data is inputted into the full connection layer, the embodiment adds a determination step to determine whether the current frame of facial image is highly similar to the previous N frames of facial image (the similarity is greater than a preset threshold, and the preset threshold can be fitted according to other data, for example, 98%); if the current frame of facial image is highly similar to the previous N frames of facial image, it is determined that the eye gaze of viewer is substantially unchanged, and the prediction result of position at which the eyes gaze of the facial image n may be outputted directly as the prediction result of position at which the eyes gaze for the current frame of facial image. This can reduce the amount of computation and thus improve the speed of eye gaze tracking. If the current frame of facial image is not highly similar to the previous N frames of facial image, then the data may be inputted into the full connection layer for feature extraction.

Figure 6:
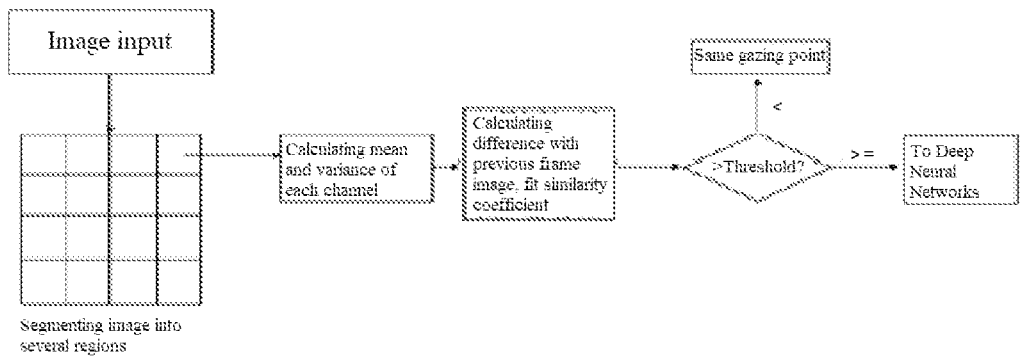
FIG. 6 is a schematic diagram of calculating a similarity between a current frame of facial image and a facial image n in previous N frames of facial images according to embodiments of the present disclosure.

As shown in FIG. 6, when calculating the similarity between the current frame of facial image and each frame of facial image in the previous N frames of facial images, the facial image can be divided into several regions (each region is also a channel), and the mean and variance of each channel are calculated. The difference between the current frame of facial image and each frame of facial image in the previous N frames of facial images is calculated, and a similarity coefficient is obtained by fitting, and a comparison is made with a threshold. The current frame of facial image and the facial image n are regarded as having the same point where the eyes gaze at, if the difference between the current frame of facial image and the facial image n is less than the threshold, and a feature extraction is performed if the difference between the current frame of facial image and the facial image n is greater than or equal to the threshold.

In the embodiment, by building a convolutional neural network and a training based on video stream of facial images which is pre-processed and input into the convolutional neural network, a detection for the eye gazing point directly based on the facial image captured by the cameras can be achieved with the trained model, so as to improve the accuracy and efficiency of eye gaze detection.

Figure 7:
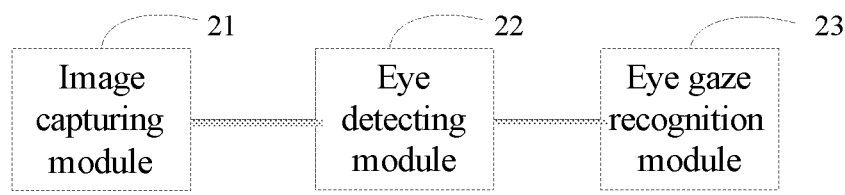
FIG. 7 is a schematic structural diagram of an eye gaze tracking apparatus according to embodiments of the present disclosure.

Embodiments of the present disclosure also provides an eye gaze tracking apparatus, as shown in FIG. 7, including:
  an image capturing module 21, configured to capture, by at least two cameras, a plurality of frames of facial images when a viewer views a display screen;
  an eye detecting module 22, configured to segment a current frame of facial image with a pre-trained eye detection model to obtain an image for left and right eyes, wherein the eye detection model is based on a convolutional neural network, an input of the eye detection model is the facial image, and an output is the image for left and right eyes that is segmented from the facial image; and
  an eye gaze recognition module 23, configured to calculate a similarity between the current frame of facial image and each frame of facial image in previous N frames of facial images; if a similarity between the current frame of facial image and a facial image n in the previous N frames of facial image is greater than a preset threshold, to determine a prediction result of a position at which the eyes gaze for the facial image n to be a prediction result of a position at which the eyes gaze for the current frame of facial image; if the similarity between the current frame of facial image and each frame of facial image in previous N frames of facial images is not greater than the preset threshold, to detect a position on display screen at which the eyes of the viewer gaze with a pre-trained eye gaze recognition model, wherein the eye gaze recognition model is based on a convolutional neural network, an input of the eye gaze recognition model is the image for left and right eyes that is segmented from the facial image and prediction results of positions at which the eyes gaze for the previous N frames of facial image, and an output of the eye gaze recognition model is the prediction result of the position at which the eyes gaze for the current frame of facial image, wherein N is a positive integer, and n is an integer greater than 1 and not greater than N.

In this embodiment, a plurality of frames of facial images when the viewer watching the display screen are obtained by the at least two cameras, and a position on the display screen at which the eyes gaze is determined with the pre-trained eye detection model and pre-trained eye gaze recognition model, the speed of eye gaze tracking is fast. In addition, factors such as motion features and environmental impact of a face can be inputted into a model by the deep learning, which can improve the accuracy of eye gaze tracking.

The technical solution of the embodiment can be applied in a variety of scenarios, such as the field of human-machine interaction, assisted driving, psychological research, Virtual Reality and military.

In a specific embodiment, the technical solution of this embodiment may be applied in a scenario of a smart screen, the position at which the viewer's eyes gaze may be determined through the eye gaze tracking, and then a driving means of the smart screen may be drove to realize a self-adaptive adjustment for horizontal and vertical placement modes of the smart screen.

In this embodiment, a camera is needed to capture a facial image of the viewer. The camera may be an infrared camera, so that the camera can capture the facial image of the viewer even in case of no visible light, and thus is independent of the environment. In order to improve the accuracy of eye gaze tracking, multiple cameras may be provided to capture facial images of the viewer, and parameters such as the field of view and resolution for the cameras can be set according to specific requirements.

In this embodiment, the eye detecting module 22 and the eye gaze recognition module 23 can be integrated in a processor. When the viewer looks at the display screen, the camera captures a facial image of the viewer and stores the facial image of the viewer. The facial image of the viewer can be transmitted to the processor, and the processor stores an eye detection model and an eye gaze recognition model that are trained in advance. The eye gaze tracking can be performed with the eye detection model and the eye gaze recognition model, to determine the position on the display screen at which the viewer's eyes gaze, and the position for the eye gazing point can be represented by coordinates; the coordinate system of the coordinate may take a point of the display screen as the origin.

The camera may transmit a facial image captured in real time to the processor, and may also capture multiple frames of facial images such as N frames of facial images and save the same, and then transmit the N frames of facial images to the processor for image processing to output a position of eye gazing point.

In an alternative embodiment of the present disclosure, an eye detection model training module is further included, configured to obtain the eye detection model by training, the eye detection model training module including the following sub modules.

A first sub-module, configured to establish a first training data set, wherein the first training data set comprises a plurality of groups of first training data, each group of the plurality of groups of first training data includes a facial image and an eye contour labeled in the facial image, and facial images and eye contours from different groups of first training data are different.

Specifically, facial images of viewers of different ages and genders may be collected, and eye contours in the facial images are labeled, where contours for left and right eyes are labeled respectively, to obtain the plurality of groups of first training data.

A second sub-module, configured to establish an initial eye detection model, wherein the initial eye detection model comprises a down-sampling network and an up-sampling network, an input of the down-sampling network is the facial image, and an output of the up-sampling network is an eye contour in the facial image.

In the embodiment, the initial eye detection model is based on an improved U-Net structure. The down-sampling network includes M down-sampling layers, and the up-sampling network includes M up-sampling layers, where M is an integer greater than 1. The down-sampling layers are in one-to-one correspondence with the up-sampling layers. An input of the first down-sampling layer is a facial image, and the i-th down-sampling layer performs a convolution operation on inputted feature with different convolution kernels, and then combines the calculation results together and transfers the combined calculation results to the (i+1)-th down-sampling layer. An input of the i-th up-sampling layer is a combination of an output of the (i+1)-th up-sampling layer and a first result, where the first result is a result obtained after a convolutional calculation is performed on an output of the i-th down-sampling layer, i is greater than or equal to 1 and less than or equal to M−1. The M-th down-sampling layer performs a convolution operation on inputted feature, and transfers a result to the M-th up-sampling layer, and an output of the M-th up-sampling layer is the eye contour in the facial image.

A third sub-module, configured to train the initial eye detection model with the plurality of groups of first training data, and saving a model obtained after the training is performed for K times as the eye detection model, wherein K is positive integer.

The value of K can be set as needed, for example, 50, 100, etc.

In an alternative embodiment of the present disclosure, an eye gaze recognition model training module is further included, configured for obtaining the eye detection model by training, the eye gaze recognition model training module including the following sub-modules.

A fourth sub-module, configured to establish the second training data set, wherein the second training data set comprises a plurality of groups of second training data, and each group of the plurality of groups of second training data comprises a facial image, an image for left and right eyes that is segmented from the facial image, positions at which the eyes gaze for previous A frames of facial images, and a position at which the eyes gaze for a current frame of facial image. For different groups of second training data, facial images are different, images for left and right eyes that are segmented from the facial image are different, positions at which the eyes gaze for previous A frames of facial images are different, and positions at which the eyes gaze for the current frame of facial image are different.

Specifically, a plurality of test points may be displayed on the display screen; a facial image of the viewer when gazing at the test point in front of the display screen are captured by the at least two cameras, the position of the test point is the position at which the eyes gaze.

When obtaining the second training data, image acquisition can be performed by a camera, and points of different sizes, colors and background colors (including cases such as appearance, disappearance and random movement of a fixed point) are randomly displayed on the display screen. The viewer in test sits in front of the display screen, and a posture of the viewer is not limited as long as the viewer's face is within the shooting range of the camera. The viewer's eye gaze moves with the points displayed on the display screen, the camera captures the face of the viewer to establish a data set, and the data set is segmented into sequential image streams. Each group of second training data includes a facial image, an image for left and right eyes that is segmented from the facial image, positions at which the eyes gaze for previous A frames of facial images and a position at which the eyes gaze for the present frame of facial image. The camera may include a left eye camera and a right eye camera, and a facial image obtained by left eye camera can be used for eye segmentation to obtain the image for left and right eyes.

In an alternative embodiment of the present disclosure, prior to training the eye gaze recognition initial model with the plurality of groups of second training data, the method further includes pre-processing the second training data, including:
  determining a distance between the viewer and the display screen according to the facial image; and
  adjusting a size of the facial image and a size of the image for left and right eyes according to the distance.

By pre-processing the second training data, a distance dimension can be added as an input to model, thereby improving the accuracy of eye gaze tracking.

Where the relative position between the camera and the display screen is fixed, a distance between the viewer and the camera can be calculated after capturing the facial image, and then the distance between the viewer and the display screen is determined according to the relative position between the camera and the display screen. The relative distance between the viewer and the display screen is attached to the facial image as a new channel dimension, and the attached facial image and a resulting image of eye segmentation are stretched to the same size.

A fifth sub-module, configured to establish an initial eye gaze recognition model, wherein an input of the initial eye gaze recognition model is the image for left and right eyes that is segmented from the facial image and the positions at which the eyes gaze for the previous A frames of facial images, and an output of the initial eye gaze recognition model is a position at which the eyes gaze for the current frame of facial image.

The initial eye gaze recognition model built by the embodiment is based on DenseNet. As shown in FIG. 4, the eye gaze recognition model successively includes a first layer of Dense module (Dense Block), a first layer of transition layer (Transition Layer), a second layer of Dense module, a second layer of transition layer, a third layer of Dense module, a third layer of transition layer and a full connection layer (Full Connection).

As shown in FIG. 5, the Dense module includes a plurality of 1*1 convolutional layers and a plurality of 3*3 convolutional layers connected in sequence. Before the result outputted by every two convolutional layers is inputted to the next two convolutions, a residual is calculated and then inputted to a subsequent convolution, for example, a residual for output from the (2j−1)-th convolutional layer and the 2j-th convolutional layer is calculated and then inputted to the (2j+5)-th convolutional layer, where j is a positive integer.

A sixth sub-module, configured to train the initial eye gaze recognition model with the plurality of groups of second training data, and saving a model obtained after the training is performed for L times as the eye gaze recognition model, wherein L and A are positive integers.

In this embodiment, an end-to-end model training is performed, and the value of L may be set as needed, for example, 50, 100, etc.

Embodiments of the present disclosure also provides an eye gaze tracking system including a display screen, at least two cameras and the eye gaze tracking apparatus as described above. Through the eye gaze tracking system of the embodiment, the eye gazing point of the viewer on the display screen can be determined when the viewer is viewing the display screen, for performing operations such as human-machine interaction.

Embodiments of the present disclosure also provides an eye gaze tracking apparatus, the eye gaze tracking apparatus including: a memory and a processor, the processor is configured for performing the method as described above, which will not be described in detail herein.

Embodiments of the present disclosure also provide a computer readable storage medium having a computer program stored thereon, which, when being executed by a processor, implements the steps of the method as described above.

In various method embodiments of the present disclosure, the sequence numerals for various steps cannot be used to define the sequence of said steps, and a variation to the sequence of various steps that can be envisaged by those skilled in the art without creative efforts also falls within the protection scope of the present disclosure.

It should be noted that various embodiments in this specification is described in a progressive manner, the same and similar parts between various embodiment can be referred to each other, and each embodiment focuses on the differences from other embodiment. In particular, for the method embodiment, since it is substantially similar to the product embodiment, the description is relatively simple, and it is sufficient to refer to the partial description of the product embodiment.

Unless defined otherwise, technical or scientific terms used in this disclosure shall have the ordinary meaning as understood by one of ordinary skill in the art to which this disclosure belongs. The use of "first", "second", and the like in this disclosure does not denote any order, quantity, or importance, but rather is used to distinguish one element from another. The word "including" or "includes", and the like, means that the presence of an element or item preceding the word encompasses the presence of the element or item listed after the word and equivalents thereof, but does not exclude other elements or items. The words "connect" or "couple" and the like are not limited to physical or mechanical connections, but may include electrical connections, whether direct or indirect. The terms "upper", "lower", "left", "right", etc. Are used only to indicate a relative position relationship, which may change accordingly when the absolute position of the object being described changes.

It can be understood that when an element such as a layer, film, region, or substrate is referred to as being located "above" or "below" another element, the element can be "directly" located "above" or "below" another element or there may be any intervening element therebetween.

In the description of the above implementations, specific features, structures, materials, or characteristics may be combined in a suitable manner in any one or more embodiments or examples.

The above embodiments are merely specific implementations of the present disclosure, but the scope of protection of the present disclosure is not limited thereto, and any modification or substitution apparent to those skilled in the art without departing from the technical scope of the present disclosure shall covered by the scope of protection of the present disclosure. Accordingly, the scope of protection of the present disclosure is as set forth in the claims.

What is claimed is:

1. An eye gaze tracking apparatus, wherein the eye gaze tracking apparatus comprises:
   a memory and an executor, the executor is configured for performing the following steps:
   capturing, by at least two cameras, a plurality of frames of facial images when a viewer views a display screen;
   segmenting a current frame of facial image with a pre-trained eye detection model to obtain an image for left and right eyes, wherein the eye detection model is based on a convolutional neural network, an input of the eye detection model is the facial image, and an output of the eye detection model is the image for left and right eyes that is segmented from the facial image; and
   calculating a similarity between the current frame of facial image and each frame of facial image in previous N frames of facial images; if a similarity between the current frame of facial image and a facial image n in the previous N frames of facial image is greater than a preset threshold, determining a prediction result of a position at which the eyes gaze for the facial image n to be a prediction result of a position at which the eyes gaze for the current frame of facial image; if the similarity between the current frame of facial image and each frame of facial image in previous N frames of facial images is not greater than the preset threshold, detecting a position on display screen at which the eyes of the viewer gaze with a pre-trained eye gaze recognition model, wherein the eye gaze recognition model is based on a convolutional neural network, an input of the eye gaze recognition model is the image for left and right eyes that is segmented from the facial image and prediction results of positions at which the eyes gaze for the previous N frames of facial images, and an output of the eye gaze recognition model is the prediction result of the position at which the eyes gaze for the current frame of facial image, wherein N is a positive integer, and n is an integer greater than 1 and not greater than N.

2. The eye gaze tracking apparatus of claim 1, wherein the executor is configured for performing a step of obtaining the eye detection model by training, wherein the step of obtaining the eye detection model by training comprises:
   establishing a first training data set, wherein the first training data set comprises a plurality of groups of first training data, each group of the plurality of groups of first training data comprises a facial image and an eye contour labeled in the facial image, and facial images and eye contours from different groups of first training data are different;
   establishing an initial eye detection model, wherein the initial eye detection model comprises a down-sampling network and an up-sampling network, an input of the down-sampling network is the facial image, and an output of the up-sampling network is an eye contour in the facial image; and
   training the initial eye detection model with the plurality of groups of first training data, and saving a model obtained after the training is performed for K times as the eye detection model, wherein K is a positive integer.

3. The eye gaze tracking apparatus of claim 2, wherein the down-sampling network comprises M down-sampling layers, the up-sampling network comprises M layers of up-sampling layers, M is an integer greater than 1, and the M down-sampling layers are in one-to-one correspondence with the M up-sampling layers;

an input of the first down-sampling layer is a facial image, and the i-th down-sampling layer performs a convolution operation on inputted feature with different convolution kernels, combines calculation results together and transfers the combined calculation results to the (i+1)-th down-sampling layer; an input of the i-th up-sampling layer is a combination of an output of the (i+1)-th up-sampling layer and a first result, wherein the first result is a result obtained after a convolutional calculation is performed on an output of the i-th down-sampling layer, i is greater than or equal to 1 and less than or equal to M−1; and the M-th down-sampling layer performs a convolution operation on inputted feature, and transfers a result to the M-th up-sampling layer, and an output of the M-th up-sampling layer is the eye contour in the facial image.

4. The eye gaze tracking apparatus of claim 3, wherein the up-sampling layer is based on an interpolation.

5. The eye gaze tracking apparatus of claim 1, wherein the executor is configured for performing a step of obtaining the eye detection model by training, wherein the step of obtaining the eye detection model by training comprises:

establishing a second training data set, wherein the second training data set comprises a plurality of groups of second training data, and each group of the plurality of groups of second training data comprises a facial image, an image for left and right eyes that is segmented from the facial image, positions at which the eyes gaze for previous A frames of facial images, and a position at which the eyes gaze for a current frame of facial image, and facial images from different groups of second training data are different;

establishing an initial eye gaze recognition model, wherein an input of the initial eye gaze recognition model is the image for left and right eyes that is segmented from a facial image and the positions at which the eyes gaze for the previous A frames of facial images, and an output of the initial eye gaze recognition model is a position at which the eyes gaze for the current frame of facial image; and training the initial eye gaze recognition model with the plurality of groups of second training data, and saving a model obtained after the training is performed for L times as the eye gaze recognition model, wherein L and A are positive integers.

6. The eye gaze tracking apparatus of claim 5, wherein the executor is configured for performing a step of preprocessing the second training data prior to training the initial eye gaze recognition model with the plurality of groups of second training data, the step of preprocessing the second training data comprising:

determining a distance between the viewer and the display screen according to the facial image; and adjusting a size of the facial image and a size of the image for left and right eyes according to the distance.

7. The eye gaze tracking apparatus of claim 5, wherein the step of obtaining the second training data comprises:

displaying a plurality of test points on the display screen; and capturing, by the at least two cameras, a facial image of the viewer gazing at the test point in front of the display screen, a position of the test point is a position at which the eyes gaze.

8. The eye gaze tracking method of claim 5, wherein the eye gaze recognition model comprises a first layer of Dense module, a first layer of transition layer, a second layer of Dense module, a second layer of transition layer, a third layer of Dense module, a third layer of transition layer and a full connection layer arranged in the sequence listed, and the Dense module comprises a plurality of 1*1 convolutional layers and 3*3 convolutional layers connected in sequence, and a residual for output from the (2j−1)-th convolutional layer and the 2j-th convolutional layer is calculated and inputted to the (2j+5)-th convolutional layer, wherein j is a positive integer.

9. An eye gaze tracking system, wherein the eye gaze tracking system comprises a display screen, at least two cameras and the eye gaze tracking apparatus of claim 1.

10. An eye gazing tracking method, wherein the method comprises:

capturing, by at least two cameras, a plurality of frames of facial images when a viewer views a display screen;

segmenting a current frame of facial image with a pre-trained eye detection model to obtain an image for left and right eyes, wherein the eye detection model is based on a convolutional neural network, an input of the eye detection model is the facial image, and an output of the eye detection model is the image for left and right eyes that is segmented from the facial image; and calculating a similarity between the current frame of facial image and each frame of facial image in previous N frames of facial images; if a similarity between the current frame of facial image and a facial image n in the previous N frames of facial image is greater than a preset threshold, determining a prediction result of a position at which the eyes gaze for the facial image n to be a prediction result of a position at which the eyes gaze for the current frame of facial image; if the similarity between the current frame of facial image and each frame of facial image in previous N frames of facial images is not greater than the preset threshold, detecting a position on display screen at which the eyes of the viewer gaze with a pre-trained eye gaze recognition model, wherein the eye gaze recognition model is based on a convolutional neural network, an input of the eye gaze recognition model is the image for left and right eyes that is segmented from the facial image and prediction results of positions at which the eyes gaze for the previous N frames of facial images, and an output of the eye gaze recognition model is the prediction result of the position at which the eyes gaze for the current frame of facial image, wherein N is a positive integer, and n is an integer greater than 1 and not greater than N.

11. The eye gaze tracking method of claim 10, wherein the method further comprises steps of obtaining the eye detection model by training, wherein the obtaining the eye detection model by training comprises:

establishing a first training data set, wherein the first training data set comprises a plurality of groups of first training data, each group of the plurality of groups of first training data comprises a facial image and an eye contour labeled in the facial image, and facial images and eye contours from different groups of first training data are different;

establishing an initial eye detection model, wherein the initial eye detection model comprises a down-sampling network and an up-sampling network, an input of the down-sampling network is the facial image, and an output of the up-sampling network is an eye contour in the facial image; and training the initial eye detection model with the plurality of groups of first training data, and saving a model obtained after the training is performed for K times as the eye detection model, wherein K is a positive integer.

12. The eye gaze tracking method of claim 11, wherein the down-sampling network comprises M down-sampling layers, the up-sampling network comprises M layers of up-sampling layers, M is an integer greater than 1, and the M down-sampling layers are in one-to-one correspondence with the M up-sampling layers;

an input of the first down-sampling layer is a facial image, and the i-th down-sampling layer performs a convolution operation on inputted feature with different convolution kernels, combines calculation results together and transfers the combined calculation results to the (i+1)-th down-sampling layer; an input of the i-th up-sampling layer is a combination of an output of the (i+1)-th up-sampling layer and a first result, wherein the first result is a result obtained after a convolutional calculation is performed on an output of the i-th down-sampling layer, i is greater than or equal to 1 and less than or equal to M−1; and the M-th down-sampling layer performs a convolution operation on inputted feature, and transfers a result to the M-th up-sampling layer, and an output of the M-th up-sampling layer is the eye contour in the facial image.

13. The eye gaze tracking method of claim 12, wherein the up-sampling layer is based on an interpolation.

14. The eye gaze tracking method of claim 10, wherein the method further comprises steps of obtaining the eye detection model by training, wherein the obtaining the eye detection model by training comprises:

establishing a second training data set, wherein the second training data set comprises a plurality of groups of second training data, and each group of the plurality of groups of second training data comprises a facial image, an image for left and right eyes that is segmented from the facial image, positions at which the eyes gaze for previous A frames of facial images, and a position at which the eyes gaze for a current frame of facial image, and facial images from different groups of second training data are different;

establishing an initial eye gaze recognition model, wherein an input of the initial eye gaze recognition model is the image for left and right eyes that is segmented from a facial image and the positions at which the eyes gaze for the previous A frames of facial images, and an output of the initial eye gaze recognition model is a position at which the eyes gaze for the current frame of facial image; and training the initial eye gaze recognition model with the plurality of groups of second training data, and saving a model obtained after the training is performed for L times as the eye gaze recognition model, wherein L and A are positive integers.

15. The eye gaze tracking method of claim 14, wherein prior to training the initial eye gaze recognition model with the plurality of groups of second training data, the method further comprises preprocessing the second training data, comprising:

determining a distance between the viewer and the display screen according to the facial image; and adjusting a size of the facial image and a size of the image for left and right eyes according to the distance.

16. The eye gaze tracking method of claim 14, wherein obtaining the second training data comprises:

displaying a plurality of test points on the display screen; and capturing, by the at least two cameras, a facial image of the viewer gazing at the test point in front of the display screen, a position of the test point is a position at which the eyes gaze.

17. The eye gaze tracking method of claim 14, wherein the eye gaze recognition model comprises a first layer of Dense module, a first layer of transition layer, a second layer of Dense module, a second layer of transition layer, a third layer of Dense module, a third layer of transition layer and a full connection layer arranged in the sequence listed, and the Dense module comprises a plurality of 1*1 convolutional layers and 3*3 convolutional layers connected in sequence, and a residual for output from the (2j−1)-th convolutional layer and the 2j-th convolutional layer is calculated and inputted to the (2j+5)-th convolutional layer, wherein j is a positive integer.

18. A non-transitory computer readable storage medium having a computer program stored thereon, wherein the program, when being executed by a processor, implements steps of the method according to claim 10.

19. The non-transitory computer readable storage medium of claim 18, wherein the program, when being executed by a processor, further implements a step of obtaining the eye detection model by training, wherein the step of obtaining the eye detection model by training comprises:

establishing a first training data set, wherein the first training data set comprises a plurality of groups of first training data, each group of the plurality of groups of first training data comprises a facial image and an eye contour labeled in the facial image, and facial images and eye contours from different groups of first training data are different;

establishing an initial eye detection model, wherein the initial eye detection model comprises a down-sampling network and an up-sampling network, an input of the down-sampling network is the facial image, and an output of the up-sampling network is an eye contour in the facial image; and training the initial eye detection model with the plurality of groups of first training data, and saving a model obtained after the training is performed for K times as the eye detection model, wherein K is a positive integer.

20. The non-transitory computer readable storage medium of claim 18, wherein the program, when being executed by a processor, further implements a step of obtaining the eye detection model by training, wherein the step of obtaining the eye detection model by training comprises:

establishing a second training data set, wherein the second training data set comprises a plurality of groups of second training data, and each group of the plurality of groups of second training data comprises a facial image, an image for left and right eyes that is segmented from the facial image, positions at which the eyes gaze for previous A frames of facial images, and a position at which the eyes gaze for a current frame of facial image, and facial images from different groups of second training data are different;

establishing an initial eye gaze recognition model, wherein an input of the initial eye gaze recognition model is the image for left and right eyes that is segmented from a facial image and the positions at which the eyes gaze for the previous A frames of facial images, and an output of the initial eye gaze recognition model is a position at which the eyes gaze for the current frame of facial image; and training the initial eye gaze recognition model with the plurality of groups of second training data, and saving a model obtained after the training is performed for L times as the eye gaze recognition model, wherein L and A are positive integers.

* * * * *